(12) United States Patent
Nagashima et al.

(10) Patent No.: US 12,344,262 B2
(45) Date of Patent: Jul. 1, 2025

(54) VEHICLE CONTROL DEVICE

(71) Applicants: JTEKT CORPORATION, Kariya (JP); TOYOTA JIDOSHA KABUSHIKI KAISHA, Toyota (JP); DENSO CORPORATION, Kariya (JP)

(72) Inventors: Yugo Nagashima, Anjo (JP); Yuji Fujita, Okazaki (JP); Yuuta Kajisawa, Okazaki (JP); Kazuma Hasegawa, Anjo (JP); Takashi Koudai, Okazaki (JP); Masaharu Yamashita, Toyota (JP); Atsushi Satou, Miyoshi (JP); Yosuke Yamashita, Nagoya (JP); Hiroyuki Katayama, Toyota (JP); Shintaro Takayama, Toyota (JP); Toyohiro Hayashi, Kariya (JP); Hiroki Tomizawa, Kariya (JP); Nobuyori Nakajima, Kariya (JP); Hayaki Tanabe, Kariya (JP); Takeshi Iwana, Kariya (JP)

(73) Assignees: JTEKT CORPORATION, Kariya (JP); TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 113 days.

(21) Appl. No.: 18/215,491

(22) Filed: Jun. 28, 2023

(65) Prior Publication Data
US 2024/0001949 A1   Jan. 4, 2024

(30) Foreign Application Priority Data

Jun. 30, 2022  (JP) .................................. 2022-105910

(51) Int. Cl.
*B60W 50/12*   (2012.01)
*B62D 15/02*   (2006.01)

(52) U.S. Cl.
CPC ........... *B60W 50/12* (2013.01); *B62D 15/029* (2013.01); *B60W 2520/28* (2013.01); *B62D 15/021* (2013.01)

(58) Field of Classification Search
CPC . B60W 50/12; B60W 2520/28; B62D 15/029; B62D 15/021
See application file for complete search history.

(56) References Cited

U.S. PATENT DOCUMENTS

2022/0063591 A1* 3/2022 Inoue ................ B60W 50/0205

FOREIGN PATENT DOCUMENTS

JP       2015143048 A   *   8/2015

OTHER PUBLICATIONS

English Machine Translation of JP-2015143048-A (Year: 2015).*

* cited by examiner

*Primary Examiner* — Andrew J Cromer
(74) *Attorney, Agent, or Firm* — Oliff PLC (57) ABSTRACT

A vehicle control device includes a driving control device configured to be supplied with electricity through a first power line and configured to execute a first process, and a steering control device configured to be supplied with electricity through a second power line and configured to execute a second process. The steering control device is configured such that, in a case where it is determined that power supply through the second power line has stopped during travel, when it is determined that the driving control device is not in a state of being able to execute the first process, the steering control device permits execution of the second process to stop, whereas when it is determined that the driving control device is in a state of being able to execute the first process, the steering control device does not permit execution of the second process to stop.

6 Claims, 5 Drawing Sheets

VEHICLE CONTROL DEVICE

CROSS-REFERENCE TO RELATED APPLICATION

This application claims priority to Japanese Patent Application No. 2022-105910 filed on Jun. 30, 2022, incorporated herein by reference in its entirety.

BACKGROUND

1. Technical Field

The present disclosure relates to a vehicle control device.

2. Description of Related Art

There is a control device that controls a motor that is a generation source of a steering force applied to a steering mechanism of a vehicle. The control device controls power supply to the motor according to a steering torque and a vehicle speed detected through on-board sensors. The steering force is a torque for steering that is generated by the motor when the advancing direction of the vehicle is changed.

For example, the control device of Japanese Unexamined Patent Application Publication No. 2015-143048 (JP 2015-143048 A) can switch a power supply path between a first power supply path and a second power supply path. The first power supply path is a power supply path including an ignition switch. The second power supply path is a power supply path including a power line that is directly led from an on-board battery. The ignition switch is a start switch of the vehicle.

During travel of the vehicle, the control device maintains the first power supply path as the power supply path. When power supply through the first power supply path is shut off during travel of the vehicle, for example, as the ignition switch is turned off, the control device switches the power supply path from the first power supply path to the second power supply path. After a predetermined period has elapsed since power supply through the first power supply path has been shut off, the control device shuts off power supply through the second power supply path.

This helps prevent a situation where generation of the steering force is immediately stopped when power supply through the first power supply path is shut off during travel of the vehicle.

SUMMARY

After the predetermined period has elapsed since power supply through the first power supply path has been shut off, the control device of JP 2015-143048 A shuts off power supply through the second power supply path, regardless of the state of the vehicle. It is conceivable that in some situations, depending on the state of the vehicle, it is not preferable to stop the generation of the steering force.

For example, the vehicle may continue traveling by inertia after the generation of the driving force for traveling is stopped as the ignition switch is turned off. In such a situation, it is not preferable to stop the generation of the steering force.

A vehicle control device according to one aspect of the present disclosure includes a driving control device and a steering control device. The driving control device is configured to be supplied with electricity through a first power line with turning on of a start switch of a vehicle as a trigger, and configured to execute a first process that generates a driving force for traveling in the vehicle. The steering control device is configured to be supplied with electricity through a second power line with turning on of the start switch as a trigger, and configured to execute a second process that generates a steering force for steering in the vehicle. The steering control device is configured such that, in a case where it is determined that power supply through the second power line has stopped during travel of the vehicle, when it is determined that the driving control device is not in a state of being able to execute the first process, the steering control device permits execution of the second process to stop, whereas when it is determined that the driving control device is in a state of being able to execute the first process, the steering control device does not permit execution of the second process to stop.

In the case where it is determined that power supply through the second power line has stopped during travel of the vehicle, the vehicle control device according to one aspect of the present disclosure can avoid a situation where execution of the second process that generates a steering force for steering in the vehicle is stopped despite the vehicle being in a state of being able to generate a driving force for traveling. Thus, it is possible to appropriately stop the generation of a steering force according to the state of the vehicle. It is also possible to appropriately maintain the steering function according to the state of the vehicle.

In the vehicle control device according to one aspect of the present disclosure, the steering control device may be configured such that, in a case where the steering control device has permitted execution of the second process to stop, the steering control device stops execution of the second process when it is determined that the vehicle has stopped traveling and that a steering wheel of the vehicle is not being steered.

The vehicle control device according to one aspect of the present disclosure can avoid a situation where execution of the second process that generates a steering force for steering in the vehicle is stopped during travel of the vehicle or while the steering wheel is steered.

In the vehicle control device according to one aspect of the present disclosure, the steering control device may be configured to determine, based on a voltage level of the first power line, whether the driving control device is in a state of being able to execute the first process.

The vehicle control device according to one aspect of the present disclosure can determine, based on the voltage level of the first power line, whether the driving control device is in a state of being able to execute the first process. In the vehicle control device according to one aspect of the present disclosure, the driving control device may be configured to start executing a specified start preparation with turning on of the start switch of the vehicle as a trigger, and to execute the first process after completing the start preparation. In this case, the steering control device may be configured to determine, based on whether the start preparation has been completed, whether the driving control device is in a state of being able to execute the first process.

The vehicle control device according to one aspect of the present disclosure can determine, based on whether the start preparation of the driving control device has been completed, whether the driving control device is in a state of being able to execute the first process. In the vehicle control device according to one aspect of the present disclosure, the second process may be a process that generates a steering reaction force applied to a steering wheel from which power transmission to turning wheels of the vehicle is cut off, and a turning force for turning the turning wheels.

In the vehicle control device according to one aspect of the present disclosure, the second process may be a process that generates an assistive force for assisting steering of a steering wheel coupled to turning wheels of the vehicle in such a manner that power is transmittable to the turning wheels.

The vehicle control device according to the present disclosure can appropriately stop the generation of a steering force according to the state of the vehicle.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
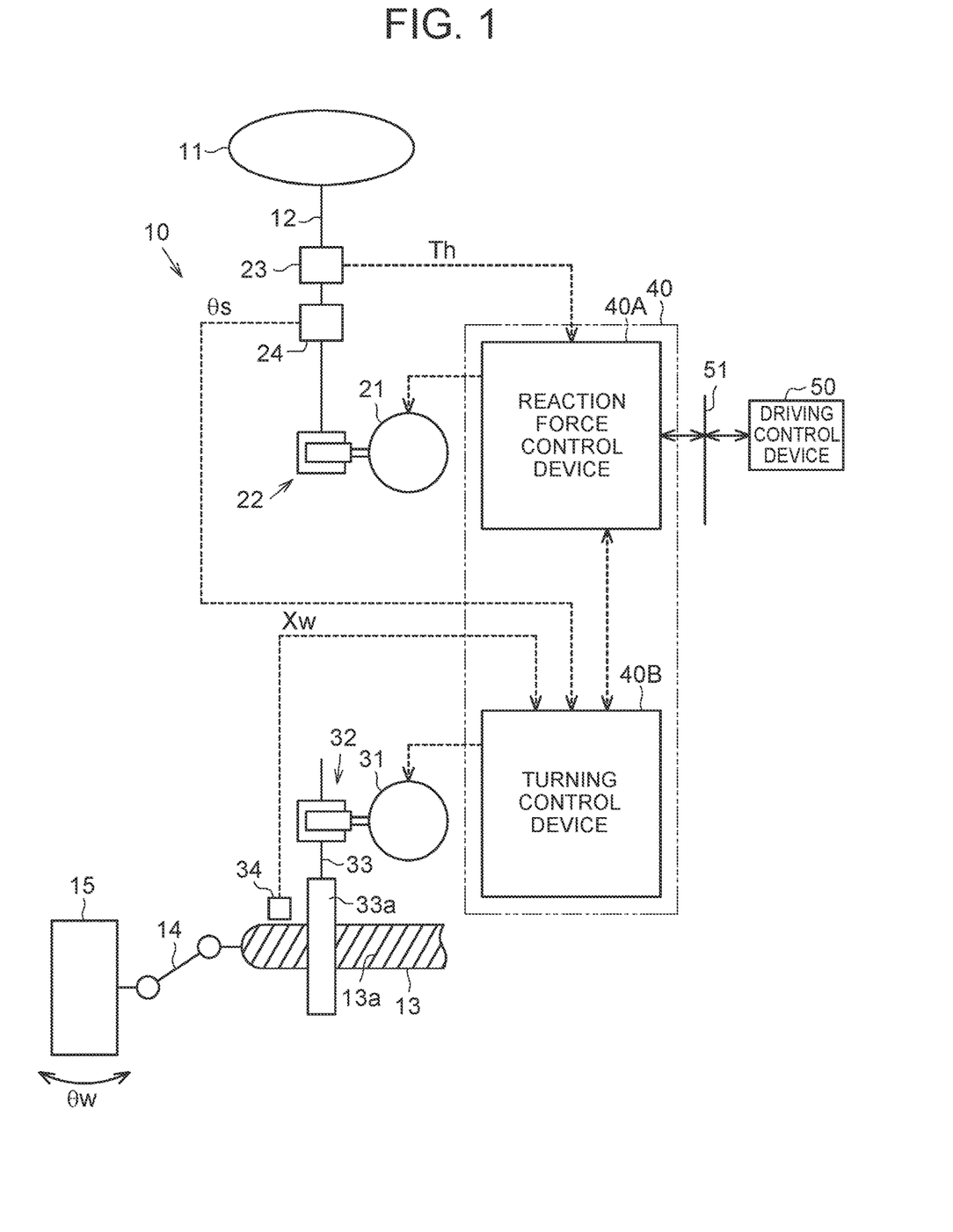
FIG. 1 is a configuration diagram of a steer-by-wire steering device in which one embodiment of a vehicle control device is installed.

One embodiment in which a steering control device is embodied as a steer-by-wire steering device will be described below. As shown in FIG. 1, a steering device 10 of a vehicle has a steering shaft 12 that is coupled to a steering wheel 11. The steering device 10 has a turning shaft 13 that extends along a vehicle width direction (the left-right direction in FIG. 1). At both ends of the turning shaft 13, turning wheels 15 are respectively coupled through tie rods 14. As the turning shaft 13 performs linear motion, a turning angle θw of the turning wheels 15 is changed. The steering shaft 12 and the turning shaft 13 constitute a steering mechanism of the vehicle. In FIG. 1, only the turning wheel 15 on one side is shown.

The steering device 10 has a reaction force motor 21 and a speed reduction mechanism 22. The reaction force motor 21 is, for example, a three-phase brushless motor. The reaction force motor 21 is a generation source of a steering reaction force. The steering reaction force refers to a force that acts toward the opposite direction from a direction in which a driver operates the steering wheel 11. The steering reaction force is a steering force for steering that is generated by the reaction force motor 21 when the advancing direction of the vehicle is changed.

A rotating shaft of the reaction force motor 21 is coupled to the steering shaft 12 through the speed reduction mechanism 22. A torque of the reaction force motor 21 is applied to the steering shaft 12 as the steering reaction force. Applying the steering reaction force to the steering wheel 11 can give the driver an appropriate sense of resistance to steering.

The steering device 10 has a turning motor 31 and a speed reduction mechanism 32. The turning motor 31 is, for example, a three-phase brushless motor. The turning motor 31 is a generation source of a turning force. The turning force refers to a motive power for turning the turning wheels 15. The turning force is a steering force for steering that is generated by the turning motor 31 when the advancing direction of the vehicle is changed.

The rotating shaft of the turning motor 31 is coupled to a pinion shaft 33 through the speed reduction mechanism 32. Pinion teeth 33a of the pinion shaft 33 are meshed with rack teeth 13a of the turning shaft 13. A torque of the turning motor 31 is applied as the turning force to the turning shaft 13 through the pinion shaft 33. As the turning motor 31 rotates, the turning shaft 13 moves along the vehicle width direction.

The steering device 10 has a steering control device 40. The steering control device 40 constitutes a vehicle control device. The steering control device 40 has a processing circuit including one of the following three configurations A1, A2, A3.

A1. One or more processors that operate in accordance with a computer program that is software. The processor includes a central processing unit (CPU) and a memory.

A2. One or more dedicated hardware circuits, such as application-specific integrated circuits (ASICs), that execute at least some of various processes. The ASIC includes a CPU and a memory.

A3. A hardware circuit combining the configurations A1, A2. The memory is a computer-readable medium and stores a program in which a process or a command for a computer is written. In this embodiment, the computer is a CPU. The memory includes a random-access memory (RAM) and a read-only memory (ROM). The CPU executes various types of control by executing a program stored in the memory on a specified arithmetic operation cycle.

The steering control device 40 includes a reaction force control device 40A and a turning control device 40B. The reaction force control device 40A controls driving of the reaction force motor 21 that is a control target. The reaction force control device 40A executes reaction force control for generating a steering reaction force according to a steering torque Th in the reaction force motor 21. The reaction force control device 40A calculates a target steering reaction force based on the steering torque Th detected through a torque sensor 23. The torque sensor 23 is provided on the steering shaft 12. The reaction force control device 40A controls power supply to the reaction force motor 21 such that the actual steering reaction force applied to the steering shaft 12 matches the target steering reaction force.

The reaction force control device 40A and the reaction force motor 21 may be integrally provided to constitute a so-called mechano-electric integrated reaction force actuator. The turning control device 40B controls driving of the turning motor 31 that is a control target. The turning control device 40B executes turning control for generating a turning force for turning the turning wheels 15 in the turning motor 31 according to the steering state. The turning control device 40B takes in a steering angle θs detected through a steering angle sensor 24 and a stroke Xw of the turning shaft 13 detected through a stroke sensor 34. The stroke Xw is an amount of shift of the turning shaft 13 with respect to its neutral position, and is a state variable reflecting the turning angle θw. The steering angle sensor 24 is provided on the steering shaft 12, between the torque sensor 23 and the speed reduction mechanism 22. The stroke sensor 34 is provided near the turning shaft 13.

The turning control device 40B calculates a target turning angle of the turning wheels 15 based on the steering angle θs detected through the steering angle sensor 24. The turning control device 40B calculates the turning angle θw based on the stroke Xw of the turning shaft 13 detected through the stroke sensor 34. The turning control device 40B controls power supply to the turning motor 31 such that the turning angle θw calculated based on the stroke Xw matches the target turning angle.

The turning control device 40B and the turning motor 31 may be integrally provided to constitute a so-called mechano-electric integrated turning actuator. The turning control device 40B and the reaction force control device 40A can communicate with each other. The turning control device 40B and the reaction force control device 40A can communicate and thereby exchange information with each other.

The vehicle has a driving control device 50. The driving control device 50 constitutes a vehicle control device. The configuration of the driving control device 50 is basically similar to that of the steering control device 40. The reaction force control device 40A and the on-board driving control device 50 are connected to each other through an on-board network 51. The on-board network 51 is, for example, a controller area network (CAN). The reaction force control device 40A and the driving control device 50 exchange information with each other through the on-board network 51.

The driving control device 50 controls travel of the vehicle. Specifically, the driving control device 50 controls, for example, a power train of the vehicle. The power train includes a travel driving source and a power transmission mechanism of the vehicle. The travel driving source generates a driving force for making the vehicle travel. The travel driving source includes, for example, an engine or a motor. When the travel driving source is an engine, the control target of the driving control device 50 includes a fuel injection device. The power transmission mechanism is a mechanism for transmitting a driving force generated by the travel driving source to driving wheels. The reaction force control device 40A controls driving of the reaction force motor 21 based on information exchanged between the reaction force control device 40A and the driving control device 50.

The control of the power train of the vehicle executed by the driving control device 50 is one example of a first process that generates a driving force for traveling in the vehicle. The reaction force control and the turning control executed by the steering control device 40 are examples of a second process that generates a steering force for steering in the vehicle.

Configuration of Control System of Vehicle

Figure 2:
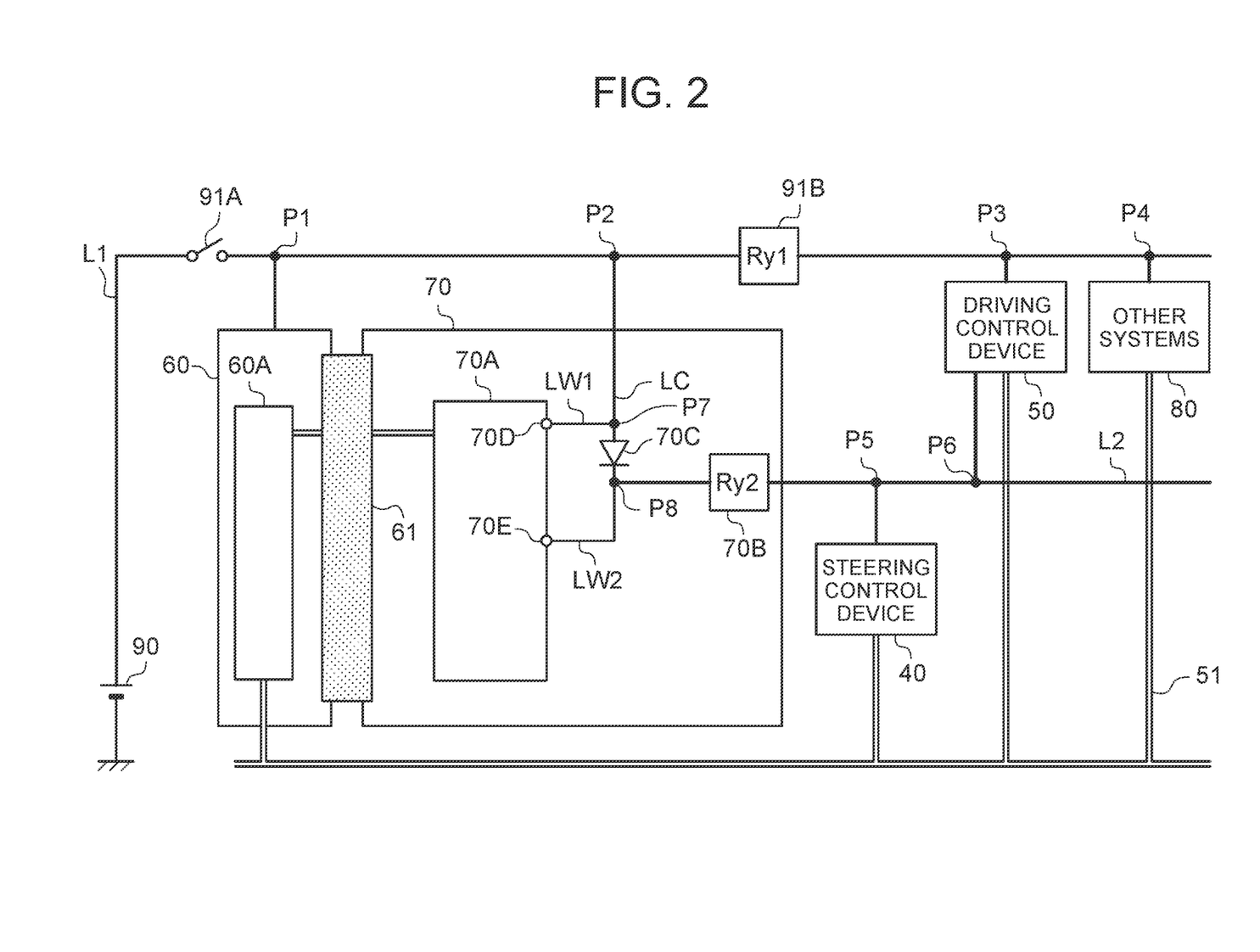
FIG. 2 is a block diagram showing the configuration of a vehicle control system according to one embodiment.

Next, the configuration of a control system of the vehicle will be described. As shown in FIG. 2, the control system of the vehicle has various control devices or systems in addition to the steering control device 40 and the driving control device 50 described above. For example, the control system has a body control device 60, a power distribution control device 70, and other systems 80. The other systems 80 include various types of systems that are required to operate when generating a driving force for traveling in the power train of the vehicle.

The various types of control devices including the steering control device 40, the driving control device 50, the body control device 60, and the other systems 80 are supplied with electricity from an on-board direct-current power source 90. The direct-current power source 90 is, for example, a battery. The various types of sensors including the torque sensor 23, the steering angle sensor 24, and the stroke sensor 34 are also supplied with electricity from the direct-current power source 90.

The steering control device 40, the driving control device 50, the body control device 60, and the other systems 80 are connected to one another through the on-board network 51. The body control device 60 and the power distribution control device 70 are communicably connected to each other through a board-to-board connector 61. The standard for communication between the body control device 60 and the power distribution control device 70 is, for example, a clock extension peripheral interface (CXPI).

The driving control device 50, the body control device 60, the power distribution control device 70, and the other systems 80 are connected to the direct-current power source 90 through a first power line L1. The steering control device 40 is connected to the direct-current power source 90 through a second power line L2 and the power distribution control device 70.

The first power line L1 has a start switch 91A and a first relay 91B. The start switch 91A is disposed at a position closer to the direct-current power source 90 than the first relay 91B is.

The start switch 91A is, for example, an ignition switch or a power switch. The start switch 91A is operated when starting or stopping the travel driving source of the vehicle, such as the engine. When the start switch 91A is turned on, electricity of the direct-current power source 90 can be supplied to each of the control devices (40, 50, 60, 70) and the other systems 80. That the start switch 91A turns on means that the vehicle power source turns on. That the start switch 91A turns off means that the vehicle power source turns off.

The first relay 91B opens and closes the first power line L1. The first relay 91B has a coil and a contact. When the coil is excited, the contact closes. When the coil is not excited, the contact opens.

The body control device 60 is connected to a first connection point P1 of the first power line L1. The first connection point P1 is located in the first power line L1, between the start switch 91A and the first relay 91B.

The power distribution control device 70 is connected to a second connection point P2 of the first power line L1. The second connection point P2 is located in the first power line L1, between the first connection point P1 and the first relay 91B.

The driving control device 50 is connected to a third connection point P3 of the first power line L1. The third connection point P3 is located on the opposite side of the first relay 91B from the second connection point P2.

The other systems 80 are connected to a fourth connection point P4 of the first power line L1. The fourth connection point P4 is located on the opposite side of the third connection point P3 from the first relay 91B.

In the first power line L1, the start switch 91A, the first connection point P1, the second connection point P2, the first relay 91B, the third connection point P3, and the fourth connection point P4 are located farther away from the direct-current power source 90 in this order.

The body control device 60 has a control circuit 60A. The control circuit 60A is a CPU. The control circuit 60A controls functions of the entire body of the vehicle. The control circuit 60A centrally controls, for example, air conditioning of the inside of a vehicle cabin, lighting of the inside and the outside of the vehicle cabin, doors, windows, mirrors, and wipers.

The power distribution control device 70 has a control circuit 70A and a second relay 70B. The control circuit 70A is a CPU. The control circuit 70A controls distribution of electricity supplied from the direct-current power source 90. The control circuit 70A can communicate with the control circuit 60A.

The second relay 70B has a configuration similar to that of the first relay 91B. An input terminal of the second relay 70B is connected to the second connection point P2 of the first power line L1 through a connection line LC. An output terminal of the second relay 70B is connected to the second power line L2. The connection line LC has a diode 70C for backflow prevention. An anode of the diode 70C is connected to the second connection point P2. A cathode of the diode 70C is connected to the input terminal of the second relay 70B.

The steering control device 40 is connected to a fifth connection point P5 of the second power line L2. The driving control device 50 is connected not only to the first power line L1 but also to a sixth connection point P6 of the second power line L2.

The control circuit 70A controls opening and closing of the first relay 91B and the second relay 70B. When the first relay 91B is turned on, the part of the first power line L1 between the second connection point P2 and the third connection point P3 becomes conductive. When the first relay 91B is turned off, conduction of the part of the first power line L1 between the second connection point P2 and the third connection point P3 becomes interrupted. When the second relay 70B is turned on, the connection line LC and the second power line L2 become conductive. When the second relay 70B is turned off, conduction between the connection line LC and the second power line L2 becomes interrupted.

The control circuit 70A has a first input terminal 70D and a second input terminal 70E. The first input terminal 70D is connected to a seventh connection point P7 of the connection line LC through a first lead-in wire LW1. The seventh connection point P7 is located in the connection line LC, between the second connection point P2 and the diode 70C. The first input terminal 70D and the first lead-in wire LW1 are connected to each other, for example, by a connector.

The second input terminal 70E is connected to an eighth connection point P8 of the connection line LC through a second lead-in wire LW2. The eighth connection point P8 is located between the diode 70C of the connection line LC and the second relay 70B. The second input terminal 70E and the second lead-in wire LW2 are connected to each other, for example, by a connector.

Through the connection line LC and the first lead-in wire LW1, the control circuit 70A takes in electricity supplied to the first relay 91B. Through the connection line LC and the second lead-in wire LW2, the control circuit 70A takes in electricity supplied to the second relay 70B. The control circuit 70A monitors a voltage level of the first input terminal 70D and a voltage level of the second input terminal 70E.

When the voltage level of the first input terminal 70D is equal to or higher than a first voltage threshold value, the control circuit 70A turns the first relay 91B on. That is, the control circuit 70A supplies an electric signal for exciting the coil of the first relay 91B to the first relay 91B. As the coil of the first relay 91B is excited, the contact of the first relay 91B closes. As the first relay 91B turns on, electricity from the direct-current power source 90 is supplied to the driving control device 50 and the other systems 80 through the first power line L1.

The first voltage threshold value is set based on a voltage that is applied to the first input terminal 70D when the start switch 91A is turned on. The voltage level of the first input terminal 70D is one example of the voltage level of the first power line L1.

The control circuit 70A sets the value of a first flag according to the voltage level of the first input terminal 70D. When the voltage level of the first input terminal 70D is equal to or higher than the first voltage threshold value, the control circuit 70A sets the value of the first flag to "1 (=Hi)." When the voltage level of the first input terminal 70D is lower than the first voltage threshold value, the control circuit 70A sets the value of the first flag to "0 (=Lo)." The first flag is information indicating an on or off state of the start switch 91A.

When the voltage level of the second input terminal 70E is equal to or higher than a second voltage threshold value, the control circuit 70A turns the second relay 70B on. That is, the control circuit 70A supplies an electric signal for exciting the coil of the second relay 70B to the second relay 70B. As the coil of the second relay 70B is excited, the contact of the second relay 70B closes. As the second relay 70B turns on, electricity from the direct-current power source 90 is supplied to the steering control device 40 and the driving control device 50 through the second power line L2.

The second voltage threshold value is set based on a voltage that is applied to the second input terminal 70E when the start switch 91A is turned on. The voltage level of the second input terminal 70E is one example of the voltage level of the second power line L2.

The control circuit 70A sets the value of a second flag according to the voltage level of the second input terminal 70E. When the voltage level of the second input terminal 70E is equal to or higher than the second voltage threshold value, the control circuit 70A sets the value of the second flag to "1 (=Hi)." When the voltage level of the second input terminal 70E is lower than the second voltage threshold value, the control circuit 70A sets the value of the second flag to "0 (=Lo)." The second flag is information indicating an on or off state of the start switch 91A.

The body control device 60 takes in the value of the first flag and the value of the second flag. The value of the first flag and the value of the second flag are shared among the various types of control devices or systems through the on-board network 51. The control devices include the steering control device 40, the driving control device 50, the body control device 60, and control devices of the other systems 80.

The steering control device 40 is connected to the direct-current power source 90 through a power source relay (not shown). When the power source relay turns on, electricity from the direct-current power source 90 is supplied to the steering control device 40 through the power source relay. When the power source relay turns off, power supply through the power source relay is shut off. The steering control device 40 controls turning on and off of the power source relay. When the start switch 91A turns on, the steering control device 40 turns the power source relay on. When the start switch 91A turns off, the steering control device 40 turns the power source relay off.

The steering control device 40 may be configured to execute power latch control that maintains the power source relay in an on state for a specified period after the start switch 91A turns off. Thus, the steering control device 40 can operate also after the start switch 91A turns off. When the specified period has elapsed, the steering control device 40 shuts off power supply to itself by turning the power source relay off.

When power supply to the steering control device 40 through the power source relay is shut off, execution of the reaction force control and the turning control by the steering control device 40 is stopped.

Turning Start Switch Off During Travel

There is a concern in the vehicle as follows. It is conceivable that the start switch 91A may be turned off during travel of the vehicle. However, since the vehicle is traveling, it is not preferable that execution of the reaction force control and the turning control by the steering control device 40 is immediately stopped as power supply to the steering control device 40 through the power source relay is shut off.

To deal with turning off of the start switch 91A during travel, one idea is to configure the steering control device 40 as follows. The steering control device 40 determines that the start switch 91A has been turned off during travel of the vehicle, for example, when all of the following three conditions B1 to B3 are met. When it is determined that the start switch 91A has been turned off during travel of the vehicle, the steering control device 40 continues execution of the reaction force control and the turning control.

B1. "$V_2 < V_{2th}$"

"$V_2$" is a voltage level of the second power line L2. "$V_{2th}$" is a voltage threshold value. The voltage threshold value is a criterion for determining whether the start switch 91A has been turned off, and is set, for example, based on the voltage level of the second power line L2 when the start switch 91A is off.

B2. "$V > V_{th1}$"

"V" is the value of a vehicle speed acquired through the on-board network 51. "$V_{th1}$" is a first vehicle speed threshold value. The first vehicle speed threshold value $V_{th1}$ is a criterion for determining whether the vehicle is traveling, and is set based on, for example, a very low speed of about a few kilometers per hour.

B3. "FG2=0"

"FG2" is the value of the second flag set by the power distribution control device 70. That the value of the second flag FG2 is "0" means that the voltage level of the second input terminal 70E is lower than the second voltage threshold value. The steering control device 40 acquires the value of the second flag FG2 through the on-board network 51.

When it is determined that the start switch 91A has been turned off during travel of the vehicle, the steering control device 40 permits execution of the reaction force control and the turning control to stop. In the case where it is determined that the start switch 91A has been turned off during travel of the vehicle, the steering control device 40 stops execution of the reaction force control and the turning control when both of the following two conditions C1, C2 are met.

C1. "$V \leq V_{th2}$" as well as "$T1 \geq T1_{th}$"

"$V_{th2}$" is a second vehicle speed threshold value. The second vehicle speed threshold value $V_{th2}$ may be the same as the first vehicle speed threshold value $V_{th1}$. "T1" is a time that has elapsed since a vehicle speed V has decreased to a value equal to or smaller than the second vehicle speed threshold value $V_{th2}$. "$T1_{th}$" is a first time threshold value. The first time threshold value is a criterion for determining whether the vehicle is stationary.

C2. "$Th \leq Th_{th}$" as well as "$T2 \geq T2_{th}$"

"Th" is a steering torque. "$Th_{th}$" is a torque threshold value. The torque threshold value is a criterion for determining whether the steering wheel 11 is not being steered. "T2" is a time that has elapsed since the steering torque Th has decreased to a value equal to or smaller than the torque threshold value. "$T2_{th}$" is a second time threshold value. The second time threshold value is a criterion for determining whether the situation is such that the steering wheel 11 is not steered.

As the condition C1, the following condition may be adopted.

C1. "$T3 \geq T3_{th}$"

"T3" is a time that has elapsed since the start switch 91A has been turned off during travel of the vehicle. "$T3_{th}$" is a third time threshold value. The third time threshold value $T3_{th}$ is set to a value that is sufficiently large compared with the first time threshold value $T1_{th}$. The third time threshold value $T3_{th}$ is a criterion for determining whether the vehicle is stationary.

Thus, even when the start switch 91A is turned off during travel of the vehicle, execution of the reaction force control and the turning control by the steering control device 40 is not immediately stopped. When the vehicle stops traveling and the steering wheel 11 is no longer steered either, execution of the reaction force control and the turning control by the steering control device 40 is stopped.

However, the following phenomenon may occur in the vehicle. As shown at part (a) of FIG. 3, it is conceivable that a connector 100 that connects the second input terminal 70E of the power distribution control device 70 and the second lead-in wire LW2 to each other may come off during travel of the vehicle. In this case, despite the start switch 91A having not been turned off, the steering control device 40 may stop execution of the reaction force control and the turning control.

Figure 3:
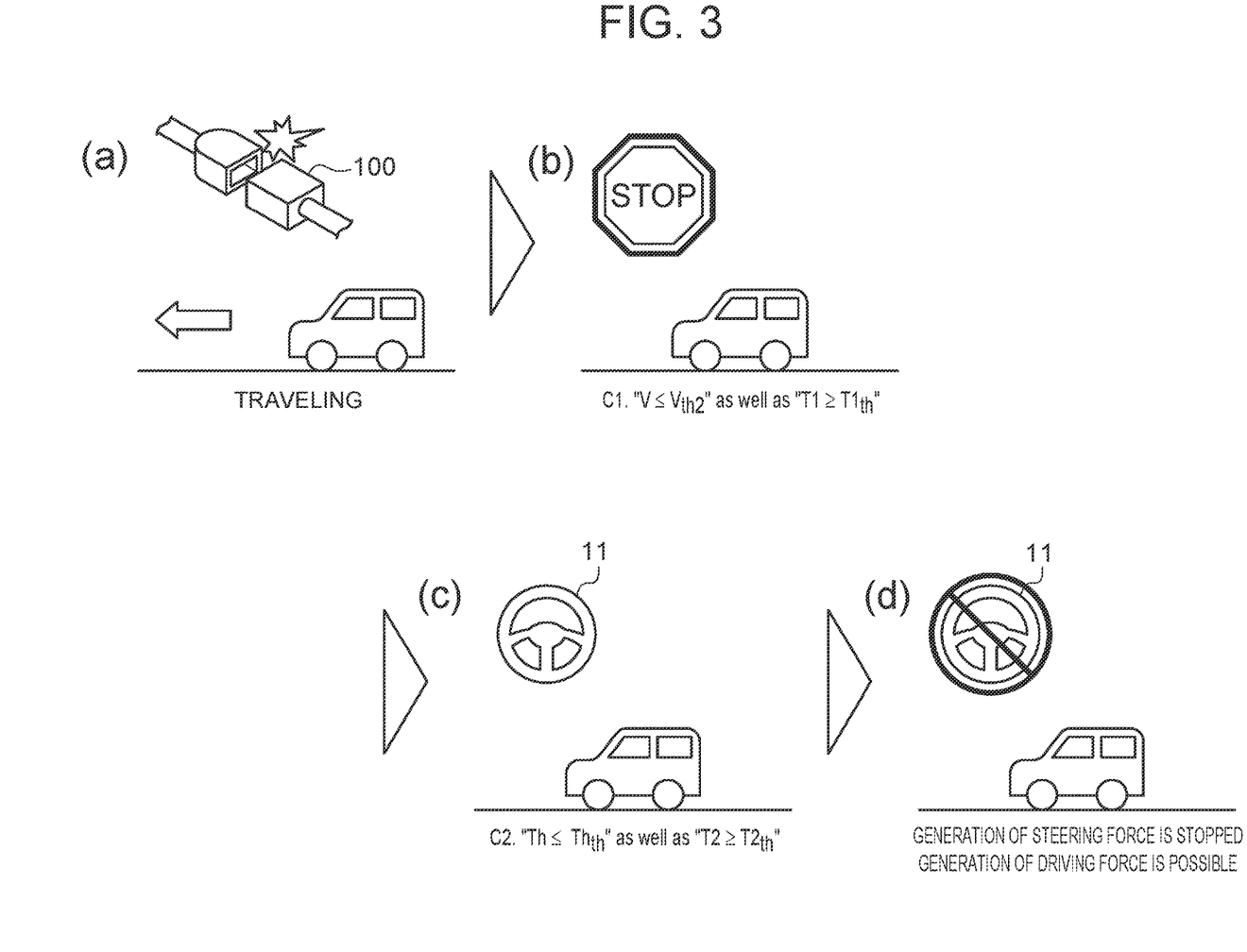
FIG. 3 is a schematic view showing a comparative example of state transition of a vehicle.

Specifically, when the connector comes off, the voltage level of the second input terminal 70E decreases to a value smaller than the second voltage threshold value. Therefore, the power distribution control device 70 sets the value of the second flag FG2 to "0." Further, when the voltage level of the second input terminal 70E decreases to a value smaller than the second voltage threshold value, the power distribution control device 70 turns the second relay 70B off. As a result, power supply from the direct-current power source 90 to the second power line L2 stops.

Thus, in the case where the vehicle is traveling and the value of the vehicle speed V is larger than the first vehicle speed threshold value $V_{th1}$, the steering control device 40 erroneously determines that the start switch 91A has been turned off during travel of the vehicle, as all of the above three conditions B1 to B3 are met.

As shown at part (b) and part (c) of FIG. 3, when thereafter the above condition C1 is met as the vehicle stops traveling, and moreover the above condition C2 is met as the steering wheel 11 is no longer steered, the steering control device 40 stops execution of the reaction force control and the turning control.

As shown at part (d) of FIG. 3, even when the steering control device 40 has stopped execution of the reaction force control and the turning control, the driving control device 50 continues operating normally. Thus, despite being in a state of being able to travel, the vehicle may lose its steering function. The steering function is a function of turning the turning wheels 15 according to the amount of operation of the steering wheel 11.

Also when breakage or ground fault of the second lead-in wire LW2 or the second power line L2 occurs during travel of the vehicle, the same phenomenon as when the connector 100 comes off may occur.

Process of Determining State of Start Switch During Travel

In this embodiment, therefore, the following configuration of the steering control device 40 is adopted. The steering control device 40 has the following condition B4, in addition to the above three conditions B1 to B3, as a condition for determining the state of the start switch 91A during travel of the vehicle.

B4. "FG1=0"

"FG1" is the value of the first flag set by the power distribution control device 70. That the value of the first flag FG1 is "0" means that the voltage level of the first input terminal 70D is lower than the first voltage threshold value. The steering control device 40 acquires the value of the first flag FG1 through the on-board network 51.

When all of the above four conditions B1 to B4 are met, the steering control device 40 determines that the start switch 91A has been turned off during travel of the vehicle. When it is determined that the start switch 91A has been turned off during travel of the vehicle, the steering control device 40 permits execution of the reaction force control and the turning control to stop. In the case where it is determined that the start switch 91A has been turned off during travel of the vehicle, the steering control device 40 stops execution of the reaction force control and the turning control when both of the above two conditions C1, C2 are met.

Workings of Embodiment

Next, the workings of the embodiment will be described. As shown at part (a) of FIG. 4, it is conceivable that the connector 100 that connects the second input terminal 70E of the power distribution control device 70 and the second lead-in wire LW2 to each other may come off during travel of the vehicle. In this case, the voltage level of the second input terminal 70E decreases to a value smaller than the second voltage threshold value. Therefore, the power distribution control device 70 sets the value of the second flag FG2 to "0." Further, when the voltage level of the second input terminal 70E decreases to a value smaller than the second voltage threshold value, the power distribution control device 70 turns the second relay 70B off. As a result, power supply from the direct-current power source 90 to the second power line L2 stops. Thus, when the vehicle is traveling and the value of the vehicle speed V is larger than the first vehicle speed threshold value $V_{th1}$, the above three conditions B1 to B3 are met.

Figure 4:
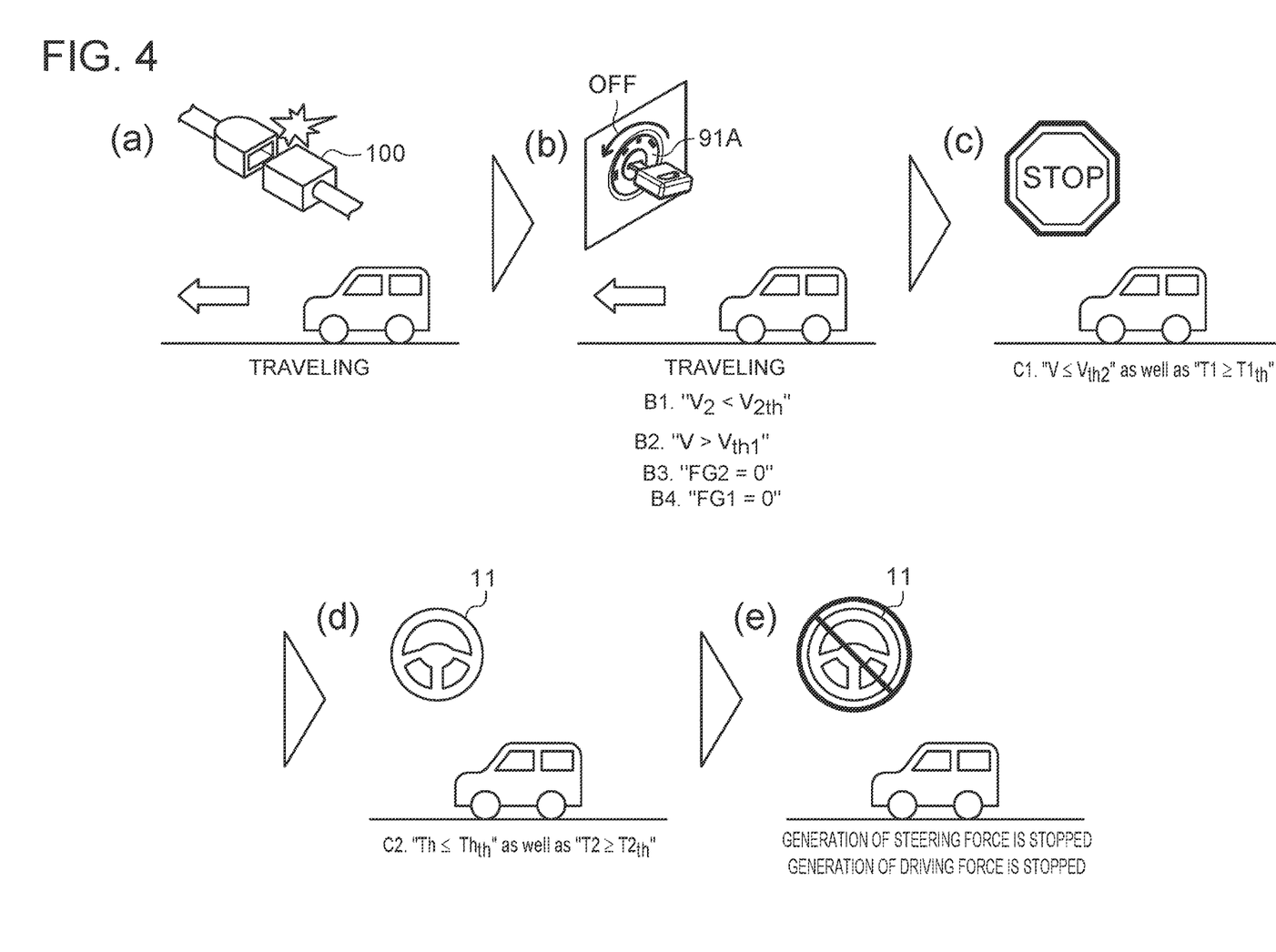
FIG. 4 is a schematic view showing state transition of a vehicle according to one embodiment.

However, when the start switch 91A has not actually been turned off, the voltage level of the first input terminal 70D is maintained at a value equal to or larger than the first voltage threshold value. That is, the value of the first flag FG1 is maintained as "1." As the above condition B4 is not met, the steering control device 40 does not determine that the start switch 91A has been turned off during travel of the vehicle.

Thus, even when both of the above two conditions C1, C2 are met, the steering control device 40 does not stop execution of the reaction force control and the turning control. Accordingly, the driving control device 50 continues operating normally, so that a situation where the vehicle loses its steering function despite being in a state of being able to travel can be avoided. The steering function is maintained as the steering control device 40 continues execution of the reaction force control and the turning control.

Also when breakage or ground fault of the second lead-in wire LW2 or the second power line L2 occurs during travel of the vehicle, the same process as when the connector 100 comes off is executed. As shown at part (b) of FIG. 4, when the start switch 91A is actually turned off during travel of the vehicle, the voltage level of the first input terminal 70D decreases to a value smaller than the first voltage threshold value. Therefore, the power distribution control device 70 sets the value of the first flag FG1 to "0." Further, when the voltage level of the first input terminal 70D decreases to a value smaller than the first voltage threshold value, the power distribution control device 70 turns the first relay 91B off. As a result, power supply from the direct-current power source 90 to the first power line L1 stops. Accordingly, the driving control device 50 and the other systems 80 stop operating, so that the power train of the vehicle does not generate a driving force for traveling. However, when the start switch 91A is turned off during travel of the vehicle, the vehicle can continue traveling by inertia.

When the start switch 91A is actually turned off during travel of the vehicle, the voltage level of the second input terminal 70E decreases to a value smaller than the second voltage threshold value. Therefore, the power distribution control device 70 sets the value of the second flag FG2 to "0." Further, when the voltage level of the second input terminal 70E decreases to a value smaller than the second voltage threshold value, the power distribution control device 70 turns the second relay 70B off. As a result, power supply from the direct-current power source 90 to the second power line L2 stops. Thus, when the vehicle is traveling and the value of the vehicle speed V is larger than the first vehicle speed threshold value $V_{th1}$, all of the above four conditions B1 to B4 are met.

As all of the above four conditions B1 to B4 are met, the steering control device 40 determines that the start switch 91A has been turned off during travel of the vehicle. As shown at part (c), part (d), and part (e) of FIG. 4, when thereafter the above condition C1 is met as the vehicle stops traveling, and moreover the above condition C2 is met as the steering wheel 11 is no longer steered, the steering control device 40 stops execution of the reaction force control and the turning control. The driving control device 50, the other systems 80, and the power train of the vehicle are maintained in a state of having stopped operating.

Advantages of Embodiment

This embodiment can offer the following advantages.

(1) In the case where it is determined that power supply through the second power line L2 has stopped during travel of the vehicle, the steering control device 40 permits execution of the reaction force control and the turning control to stop when it is determined that the driving control device 50 is not in a state of being able to execute the process that generates a driving force for traveling. On the other hand, in the case where it is determined that power supply through the second power line L2 has stopped during travel of the vehicle, the steering control device 40 does not permit execution of the reaction force control and the turning control to stop when it is determined that the driving control device 50 is in a state of being able to execute the process that generates a driving force for traveling.

Thus, in the case where it is determined that power supply through the second power line L2 has stopped during travel of the vehicle, a situation can be avoided where execution of the reaction force control and the turning control is stopped despite the vehicle being in a state of being able to generate a driving force for traveling. That is, execution of the reaction force control and the turning control is stopped according to the state of the vehicle, so that the steering function can be appropriately stopped. Further, execution of the reaction force control and the turning control is continued according to the state of the vehicle, so that the steering function can be appropriately maintained.

(2) It is conceivable that power supply through the second power line L2 may stop, for example, due to the connector 100 coming off. When the connector 100 comes off, only power supply through the second power line L2 is stopped while power supply through the first power line L1 is continued. On the other hand, when the start switch 91A is turned off, both of power supply through the first power line L1 and power supply through the second power line L2 are stopped.

In view of this, in the case where it is determined that power supply through the second power line L2 has stopped during travel of the vehicle, the steering control device 40 does not permit execution of the reaction force control and the turning control to stop when it is determined that the driving control device 50 is in a state of being able to execute the process that generates a driving force for traveling. That is, even when the above conditions B1 to B3 are met, unless the condition B4 is met, the steering control device 40 does not permit execution of the reaction force control and the turning control to stop. Thus, whether the start switch 91A has been turned off can be determined more accurately. This helps prevent the steering control device 40 from erroneously stopping execution of the reaction force control and the turning control due to the connector 100 coming off.

The same applies to the case where breakage or ground fault has occurred in the second lead-in wire LW2 or the second power line L2.

(3) In the case where the steering control device 40 has permitted execution of the reaction force control and the turning control to stop, the steering control device 40 stops execution of the reaction force control and the turning control when the above two conditions C1, C2 are met and it is therefore determined that the vehicle has stopped traveling and that moreover the steering wheel 11 is not being steered. Thus, a situation can be avoided where execution of the reaction force control and the turning control is stopped during travel of the vehicle or while the steering wheel 11 is being steered.

(4) The steering control device 40 can easily determine, based on the voltage level of the first power line L1, whether the driving control device 50 is in a state of being able to execute the process that generates a driving force for traveling. The voltage level of the first power line L1 can be recognized based on the value of the first flag FG1 that is set by the power distribution control device 70.

(5) In the steer-by-wire steering device 10, power transmission between the steering wheel 11 and the turning wheels 15 is cut off. Therefore, the steering device 10 is required to appropriately maintain the steering function, or appropriately stop the steering function, according to the state of the vehicle. In this respect, even when it is determined that the start switch 91A has been turned off during travel of the vehicle, the steering control device 40 does not stop execution of the reaction force control and the turning control during travel of the vehicle or when the steering wheel 11 is being steered. Thus, this embodiment is suitable for the steer-by-wire steering device 10.

Other Embodiments

The embodiment may be implemented with the following changes made thereto.

The reaction force motor 21 may have a set of windings of a first system and a set of wirings of a second system. The set of wirings of the first system and the set of wirings of the second system are wound around a common stator. The set of wirings of the first system and the set of wirings of the second system are equivalent to each other in electric characteristics. The reaction force control device 40A controls power supply to the sets of windings of the two systems in the reaction force motor 21 for each system independently.

In this case, the reaction force control device 40A may have a first system circuit and a second system circuit. The first system circuit controls power supply to the set of windings of the first system in the reaction force motor 21 according to the steering torque Th detected through the torque sensor 23. The second system circuit controls power supply to the set of windings of the second system in the reaction force motor 21 according to the steering torque Th detected through the torque sensor 23.

The turning motor 31 may have a set of windings of a first system and a set of wirings of a second system. The set of wirings of the first system and the set of wirings of the second system are wound around a common stator. The set of wirings of the first system and the set of wirings of the second system are equivalent to each other in electric characteristics. The turning control device 40B controls power supply to the sets of windings of the two systems in the turning motor 31 for each system independently.

In this case, the turning control device 40B may have a first system circuit and a second system circuit. The first system circuit controls power supply to the set of windings of the first system in the turning motor 31 according to the steering angle θs detected through the steering angle sensor 24 and the stroke Xw of the turning shaft 13 detected through the stroke sensor 34. The second system circuit controls power supply to the set of windings of the second system in the turning motor 31 according to the steering angle θs detected through the steering angle sensor 24 and the stroke Xw of the turning shaft 13 detected through the stroke sensor 34.

The driving control device 50 starts executing a specified start preparation when the start switch 91A is turned on, i.e., when the vehicle power source is turned on. After completing the start preparation, the driving control device 50 starts the power train of the vehicle. When execution of the process of starting the power train is completed, the driving control device 50 turns a preparation completion signal on. The preparation completion signal is information indicating that the power train of the vehicle is in a state of being able to generate a driving force for traveling. The preparation completion signal may be a third flag. When the power train of the vehicle is in a state of being able to generate a driving force for traveling, the driving control device 50 sets the value of the third flag to "1." When the power train of the vehicle is not in a state of being able to generate a driving force for traveling, the driving control device 50 sets the value of the third flag to "0."

Based on this premise, the steering control device 40 may adopt the following condition B5, instead of the above condition B4, as a condition for determining the state of the start switch 91A during travel of the vehicle.

B5. "FG3=0"

"FG3" is the value of the third flag that is set by the driving control device 50. The steering control device 40 acquires the value of the third flag FG3 through the on-board network 51.

Thus, the steering control device 40 can determine, based on whether the start preparation of the driving control device 50 has been completed, whether the driving control device 50 is in a state of being able to execute the process that generates a driving force for traveling. Further, the steering control device 40 can determine, based on whether all of the above four conditions B1 to B3, B5 are met, whether the start switch 91A has been turned off during travel of the vehicle. When it is determined that the start switch 91A has been turned off during travel of the vehicle, the steering control device 40 permits execution of the reaction force control and the turning control to stop. The steering control device 40 stops execution of the reaction force control and the turning control when both of the above two conditions (C1), (C2) are met.

Figure 5:
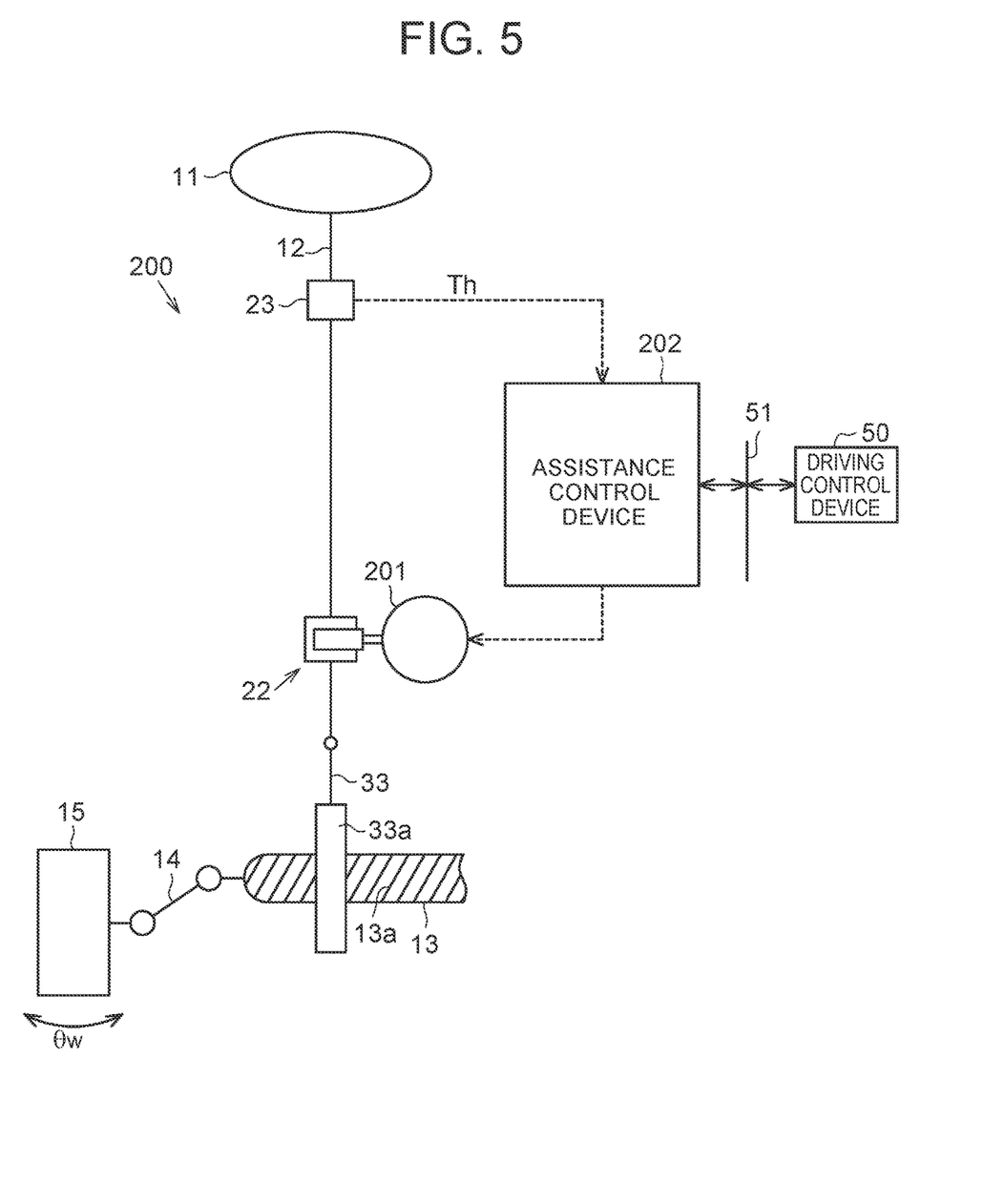
FIG. 5 is a configuration diagram of an electric power steering device in which a vehicle control device according to another embodiment is installed.

The steering control device 40 may be embodied in an electric power steering device. In an electric power steering device 200, the steering wheel 11 and the turning wheels 15 shown in FIG. 1 described above are mechanically coupled to each other. Thus, the steering shaft 12, the pinion shaft 33, and the turning shaft 13 function as a power transmission path between the steering wheel 11 and the turning wheels 15. As the turning shaft 13 performs linear motion in accordance with steering of the steering wheel 11, the turning angle θw of the turning wheels 15 is changed.

The electric power steering device 200 has an assistance motor 201 and an assistance control device 202. The assistance motor 201 is provided at the same position as the reaction force motor 21 or the turning motor 31 shown in FIG. 1 described above. In FIG. 5, as one example, the assistance motor 201 is provided at the same position as the reaction force motor 21 shown in FIG. 1. The assistance control device 202 is one example of the steering control device. The assistance control device 202 controls driving of the assistance motor 201 that is a control target. The assistance control device 202 executes assistance control for generating an assistive force in the assistance motor 201. The assistive force is a torque for assisting operation of the steering wheel 11, and is a torque in the same direction as the steering direction of the steering wheel 11. The assistive force is a steering force for steering that is generated by the assistance motor 201 when the advancing direction of the vehicle is changed.

The assistance control device 202 determines whether the start switch 91A has been turned off during travel of the vehicle based on whether all of the above four conditions B1 to B4 are met. When all of the above four conditions B1 to B4 are met, the assistance control device 202 determines that the start switch 91A has been turned off during travel of the vehicle. In the case where it is determined that the start switch 91A has been turned off during travel of the vehicle, the assistance control device 202 stops execution of the assistance control when both of the above two conditions C1, C2 are met.

When the connector 100 comes off during travel of the vehicle, the above condition B4 is not met. Therefore, when the connector 100 comes off during travel of the vehicle, the assistance control device 202 does not erroneously determine that the start switch 91A has been turned off during travel of the vehicle. Even when both of the above two conditions C1, C2 are met, the assistance control device 202 continues execution of the assistance control. Thus, a situation where the vehicle loses its steering function despite being in a state of being able to travel is avoided.

What is claimed is:

1. A control system comprising:
    a driving control device configured to be supplied with electricity through a first power line with turning on of a start switch of a vehicle as a trigger, the driving control device comprising a processor and a memory and being configured to execute a first process that generates a driving force for traveling in the vehicle; and
    a steering control device configured to be supplied with electricity through a second power line with turning on of the start switch as a trigger, the steering control device comprising a processor and a memory and being configured to execute a second process that generates a steering force for steering in the vehicle, wherein
    the steering control device is configured such that, in a case where it is determined that power supply through the second power line has stopped during travel of the vehicle:
       (1) the steering control device permits execution of the second process to stop when it is determined that the driving control device is not in a state of being able to execute the first process; and
       (2) the steering control device does not permit the execution of the second process to stop when it is determined that the driving control device is in the state of being able to execute the first process.

2. The control system according to claim 1, wherein the steering control device is configured such that, in a case where the steering control device has permitted the execution of the second process to stop, the steering control device stops the execution of the second process when it is determined (i) that the vehicle has stopped traveling and (ii) that a steering wheel of the vehicle is not being steered.

3. The control system according to claim 1, wherein the steering control device is configured to determine, based on a voltage level of the first power line, whether the driving control device is in the state of being able to execute the first process.

4. The control system according to claim 1, wherein:
    the driving control device is configured to start executing a specified start preparation with turning on of the start switch of the vehicle as a trigger, and the driving control device is configured to execute the first process after completing the start preparation; and
    the steering control device is configured to determine, based on whether the start preparation has been completed, whether the driving control device is in the state of being able to execute the first process.

5. The control system according to claim 1, wherein the second process is a process that generates (i) a steering reaction force, which is applied to a steering wheel from which power transmission to turning wheels of the vehicle is cut off, and (ii) a turning force for turning the turning wheels.

6. The control system according to claim 1, wherein the second process is a process that generates an assistive force for assisting steering of a steering wheel coupled to turning wheels of the vehicle in such a manner that power is transmittable to the turning wheels.

* * * * *